United States Patent
Choi et al.

(10) Patent No.: US 8,702,296 B2
(45) Date of Patent: Apr. 22, 2014

(54) DISPLAY APPARATUS

(75) Inventors: Kwang-Wook Choi, Cheonan-si (KR); YongWoo Lee, Suwon-si (KR); Joo Woan Cho, Asan-si (KR); Seongsik Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 172 days.

(21) Appl. No.: 13/282,621

(22) Filed: Oct. 27, 2011

(65) Prior Publication Data

US 2012/0300490 A1 Nov. 29, 2012

(30) Foreign Application Priority Data

May 26, 2011 (KR) ........................ 10-2011-0050313

(51) Int. Cl.
*F21V 7/04* (2006.01)
(52) U.S. Cl.
USPC ............................ 362/633; 362/603; 362/602
(58) Field of Classification Search
USPC ......................................... 362/602, 603, 633
See application file for complete search history.

(56) References Cited

FOREIGN PATENT DOCUMENTS

| JP | 10-311974 A | 11/1998 |
| JP | 11-281963 A | 10/1999 |
| JP | 2005-017890 A | 1/2005 |

OTHER PUBLICATIONS

English Translation of JP11-281963 published Oct. 15, 1999.*

* cited by examiner

*Primary Examiner* — Mary Ellen Bowman
(74) *Attorney, Agent, or Firm* — Cantor Colburn LLP

(57) ABSTRACT

A display apparatus includes a display panel which receives a light and displays an image, a bottom chassis which accommodates the display panel, and a top chassis which faces the bottom chassis with the display panel therebetween. The top chassis overlaps a portion of the display panel and includes a first thru-hole which extends through a thickness of a side portion thereof. The display apparatus includes a printed circuit board and a coupling member. The printed circuit board applies an electrical signal to the display panel, is under the side portion, and includes a second thru-hole which corresponds to the first thru-hole. The coupling member extends through the first thru-hole and the second thru-hole, and couples the top chassis and the printed circuit board to each other.

19 Claims, 7 Drawing Sheets

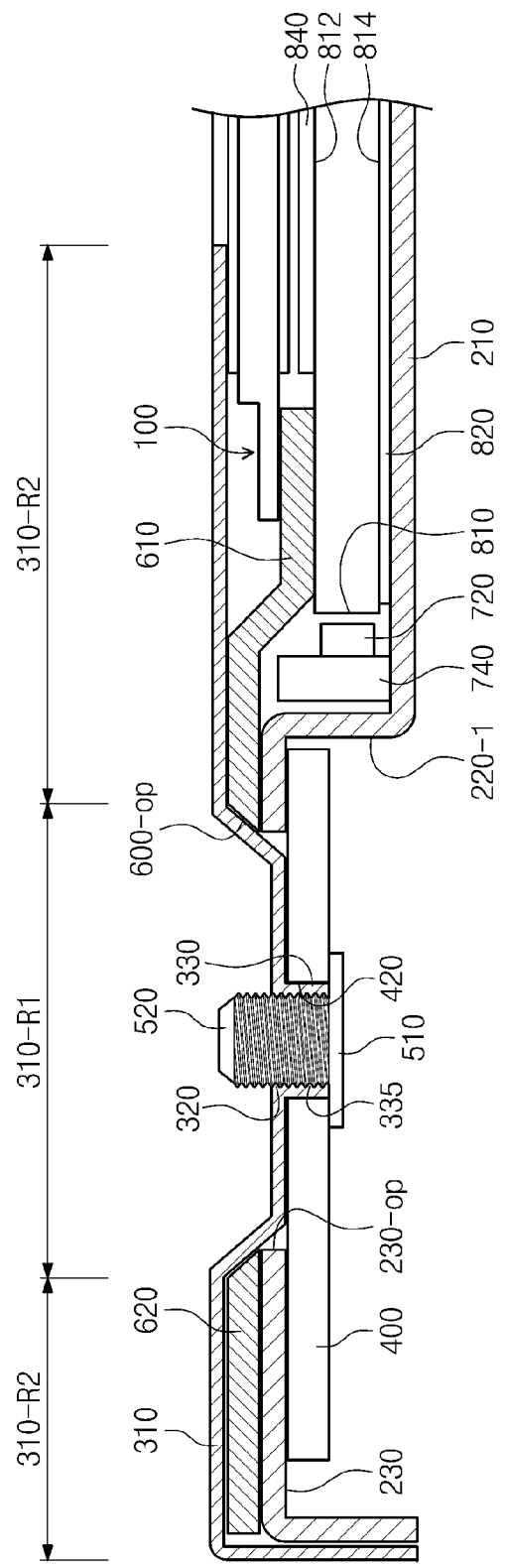

DISPLAY APPARATUS

This application claims priority to Korean Patent Application No. 10-2011-0050313 filed on May 26, 2011, and all the benefits accruing therefrom under 35 U.S.C. §119, the contents of which are herein incorporated by reference in its entirety.

BACKGROUND OF THE INVENTION

1. Field of the Invention

The invention relates to a display apparatus. More particularly, the invention relates to a display apparatus having lightweight, thin-shaped and low-power consumption properties.

2. Description of the Related Art

A liquid crystal display includes a display panel displaying an image, a printed circuit board including a driving circuit to apply electrical signals to the display panel, and a chassis accommodating the display panel and the printed circuit board or coupling the printed circuit board with the display panel.

In general, the printed circuit board is disposed under the display panel of the display apparatus, and thus the thickness of the display apparatus increases by the thickness of the printed circuit board.

In addition, when the display panel, the printed circuit board, and the chassis are assembled to each other to complete the display apparatus, the printed circuit board is separated from the display panel of the apparatus.

BRIEF SUMMARY OF THE INVENTION

Exemplary embodiments of the invention provide a display apparatus having lightweight, thin-shaped and low-power consumption properties.

According to the exemplary embodiments, a display apparatus includes a display panel which receives a light and displays an image using the light, a bottom chassis which accommodates the display panel, and a top chassis which faces the bottom chassis with the display panel therebetween. The top chassis overlaps a portion of the display panel and includes a first thru-hole which extends through a thickness of a side portion thereof In addition, the display apparatus includes a printed circuit board and a coupling member. The printed circuit board applies an electrical signal to the display panel, is under the side portion, and includes a second thru-hole which corresponds to the first thru-hole. The coupling member extends through the first thru-hole and the second thru-hole, and couples the top chassis and the printed circuit board to each other.

The first thru-hole includes a first screw mountain and a first screw valley on an inner wall of the first thru-hole, and the coupling member includes a second screw valley and a second screw mountain, which are coupled with the first screw mountain and the first screw valley, respectively.

In addition, the side portion includes a first region including the first thru-hole, and a second region adjacent to the first region. The display apparatus further includes a protrusion portion which protrudes from edges of the first thru-hole in the first region and includes a third thru-hole which is aligned with the first thru-hole. The first screw mountain and the first screw valley are extended to an inner wall of the third thru-hole.

An upper surface of the side portion in the first region is at a level lower than a level of an upper surface of the side portion in the second region, and a lower surface of the side portion in the first region is at the level lower than the level of a lower surface of the side portion in the second region.

The protrusion portion may protrude towards the printed circuit board from the lower surface of the side portion in the first region, and the protrusion portion may extend into the second thru-hole.

The display apparatus further includes a light source in the bottom chassis and emitting the light, and a light guide plate under the display panel. The light guide plate guides the light emitted from the light source to the display panel.

According to the above, the printed circuit board is not under the display panel, so that an overall thickness of the display apparatus may be reduced. In addition, since the printed circuit board is coupled with the top chassis by the coupling member, the printed circuit board may be securely coupled with the top chassis.

BRIEF DESCRIPTION OF THE DRAWINGS

The above and other features of the invention will become readily apparent by reference to the following detailed description when considered in conjunction with the accompanying drawings wherein:

FIG. 6 is a cross-sectional view showing still another exemplary embodiment of a display apparatus according to the invention.

DETAILED DESCRIPTION OF THE INVENTION

Figure 1:
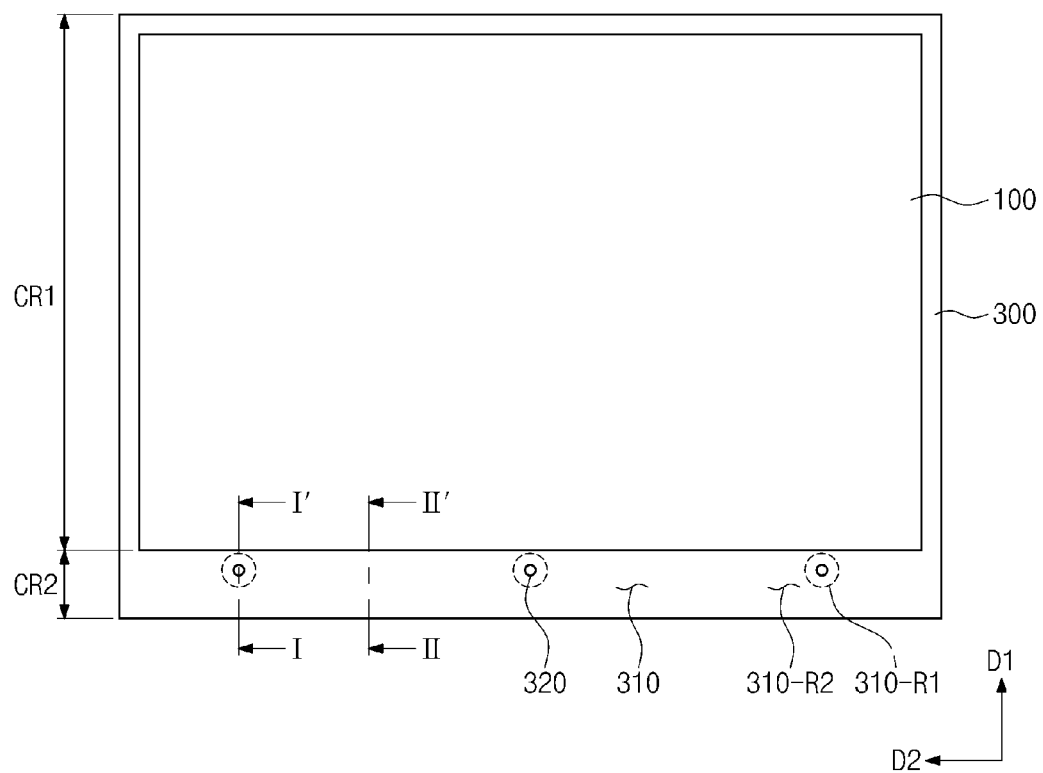
FIG. 1 is a plan view showing an exemplary embodiment of a display apparatus according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below", "lower", "above", "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 2:
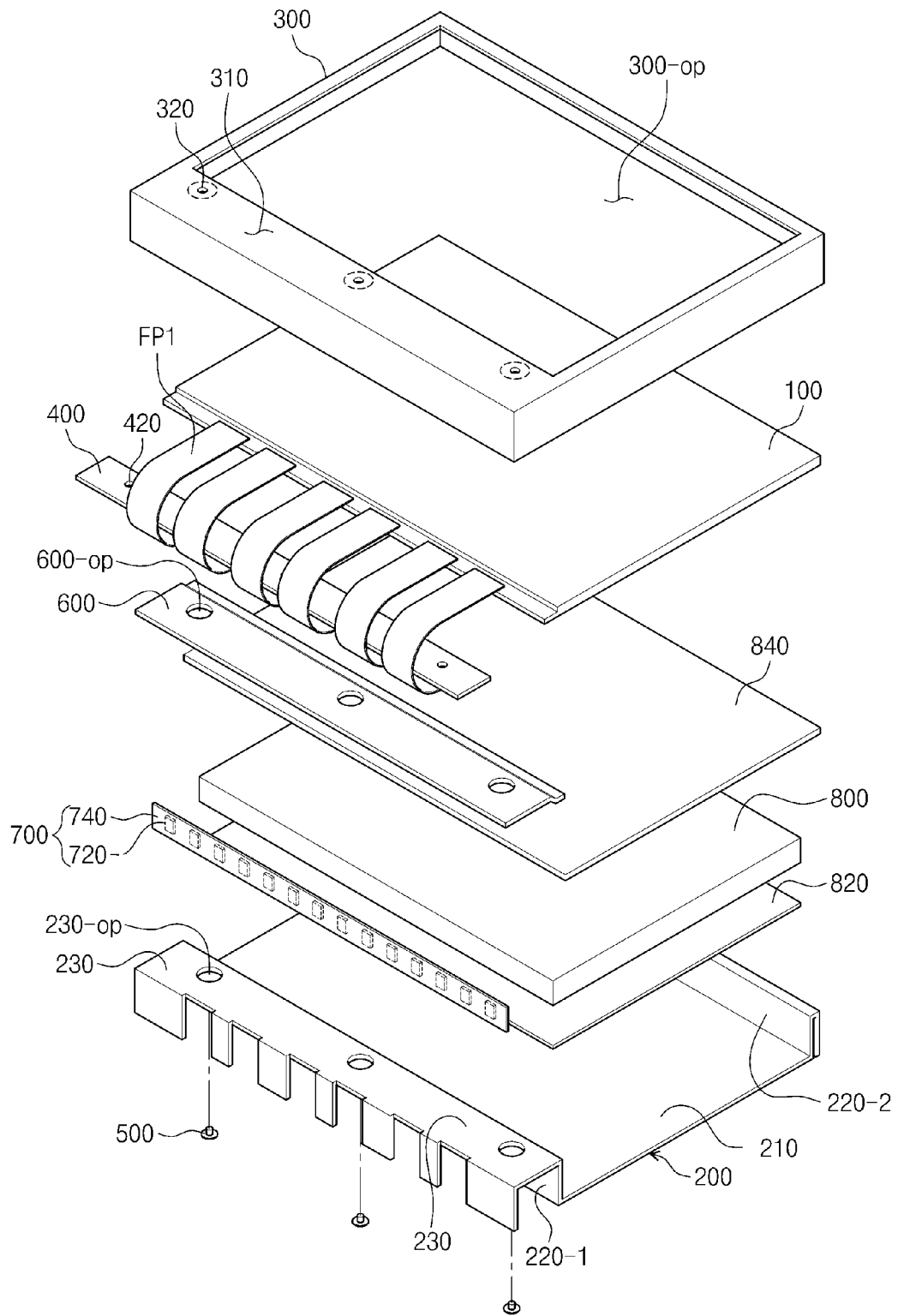
FIG. 2 is an exploded perspective view showing the display apparatus in FIG. 1.
Figure 3:
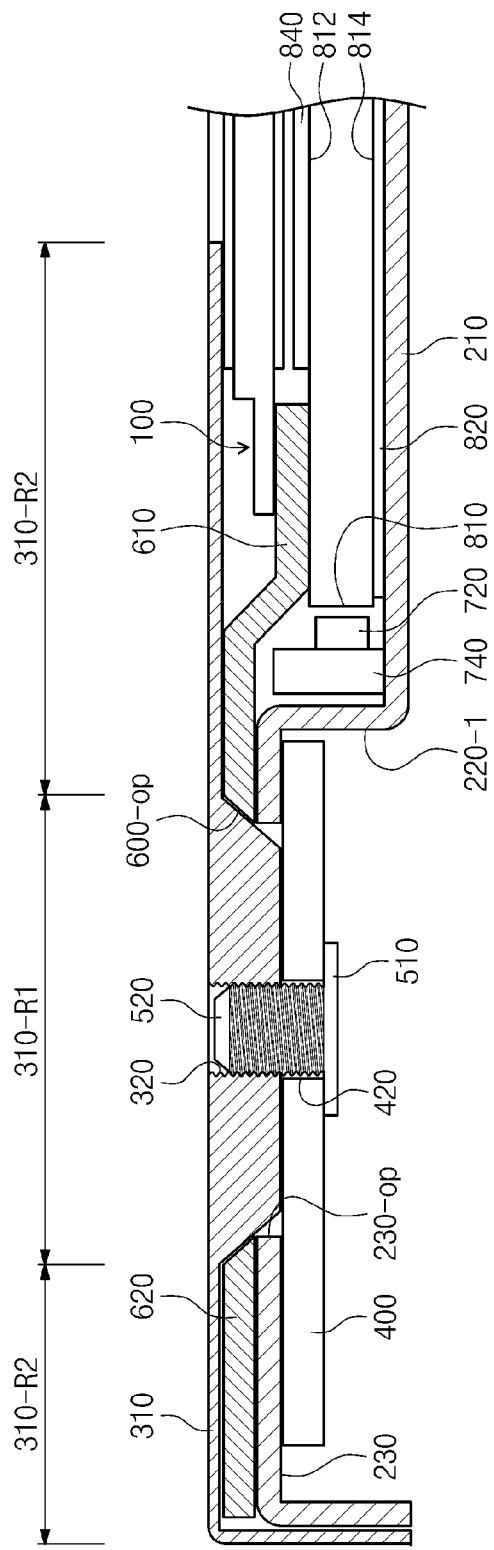
FIG. 3 is a cross-sectional view taken along line I-I' shown in FIG. 1.
Figure 4:
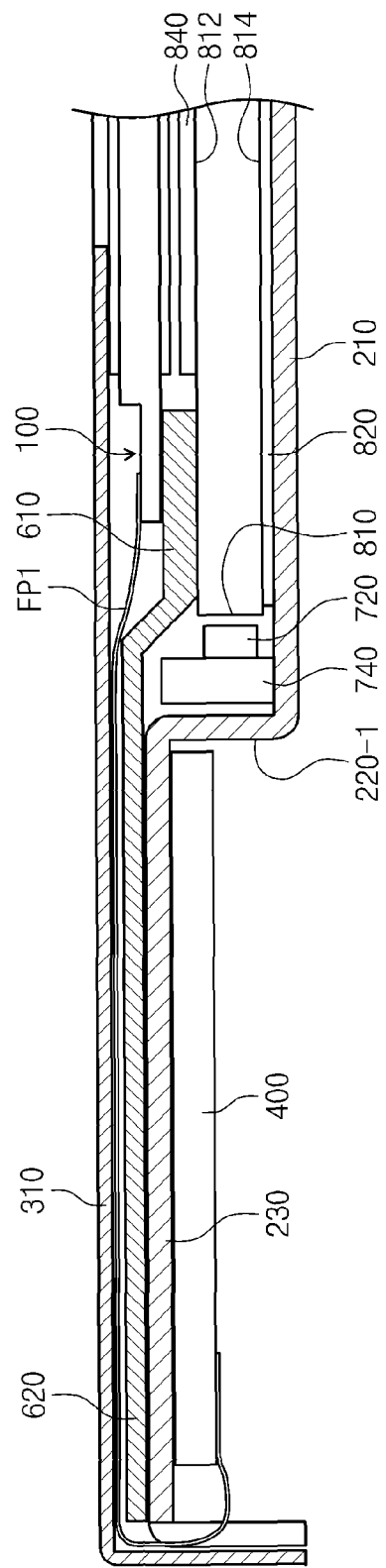
FIG. 4 is a cross-sectional view taken along line II-II' shown in FIG. 1.

FIG. 1 is a plan view showing an exemplary embodiment of a display apparatus according to the invention, FIG. 2 is an exploded perspective view showing the display apparatus in FIG. 1, FIG. 3 is a cross-sectional view taken along line I-I' shown in FIG. 1, and FIG. 4 is a cross-sectional view taken along line II-IF shown in FIG. 1.

As shown in FIGS. 1 to 4, the display apparatus includes a display panel 100 that receives light and displays an image using the received light. The display panel 100 may be a liquid crystal display panel, an electrophoretic display panel, an electro-wetting display panel, but it should not be limited thereto or thereby.

When assuming that the display panel 100 is the liquid crystal display panel, the display panel 100 includes a first substrate (not shown), a second substrate (not shown) facing the first substrate, and a liquid crystal layer (not shown) between the first substrate and the second substrate. The first substrate includes a display area, and a non-display area adjacent to at least one side of the display area. The image is displayed in the display area and is not displayed in the non-display area.

The first substrate includes a plurality of gate lines in the display area, a plurality of data lines in the display area, and a plurality of pixels. The data lines are insulated from the gate lines and cross the gate lines. Each pixel includes a thin film transistor connected to a corresponding gate line among the gate lines and a corresponding data line among the data lines. In addition, each pixel includes a pixel electrode connected to the thin film transistor.

The first substrate includes a plurality of pads in the non-display area. The pads include gate pads respectively corresponding to ends of the gate lines and data pads respectively corresponding to ends of the data lines. External wires are connected to the pads to apply signals to the pixels.

The second substrate may include a common electrode on a surface of the second substrate, which faces the first substrate. In addition, the second substrate includes color filters which are used to display red, green, and blue colors. However, the common electrode and the color filters may be on the first substrate according to alternative embodiments.

In addition, the display apparatus includes a bottom chassis 200 to accommodate the display panel 100. The bottom chassis 200 includes a bottom portion 210, and a sidewall portion bent upwardly from the bottom portion 210. When the bottom portion 210 has a rectangular shape in a plan view, the sidewall may be bent and extended from at least one end of four ends of the bottom portion 210, such that the bottom portion 210 and the sidewall collectively form a single, unitary, indivisible member. FIG. 2 shows the bottom chassis 200 including a first sidewall portion 220-1 and a second sidewall portion 220-2 each respectively bent and continuously extended from two opposite ends of the bottom portion 210.

The bottom chassis 200 may further include a coupling portion 230 bent and continuously extended from the sidewall portion as shown in FIGS. 2 and 3. For instance, the coupling portion 230 may be bent and extended from the first sidewall portion 220-1. The bottom portion 210, the sidewall portion 220-1 and the coupling portion 230 collectively form a single, unitary, indivisible member.

In addition, the display apparatus includes a top chassis 300 facing the bottom chassis 200 while interposing the display panel 100 therebetween. The top chassis 300 presses the display panel 100 on the bottom chassis 200 to reduce or effectively prevent separation of the display panel 100 from the bottom chassis 200. The top chassis 300 and the bottom chassis 200 may be a single, unitary, indivisible member.

The top chassis 300 covers (e.g., overlaps) at least a portion of the display panel 100 and includes at least one first thru-hole 320 which extends through a side portion 310. FIGS. 1 and 2 show the top chassis 300 including three first thru-holes 320. The top chassis 300 may have a rectangular frame shape and provide an opening 300-*op* corresponding to the display area of the display panel 100. When viewed in a plan view, the side portion 310 through which the first thru-holes 320 are extended may have a planar area larger than planar area of other side portions of the top chassis 300. In the illustrated exemplary embodiment, the first thru-holes 320 have the same structure and function, and thus hereinafter one first thru-hole 320 will be described in detail.

The top chassis 300 may include a first cover region CR1 which covers a portion of the display panel 100 (e.g., the non-display area of the display panel) and a second cover region CR2 including the first thru-holes 320 and covering a printed circuit board 400. The side portion 310 is included in the second cover region CR2.

In addition, the display apparatus includes the printed circuit board 400. The printed circuit board 400 may have a multi-layer structure in which an insulating layer and a circuit layer are repeatedly stacked on each other. The printed circuit board 400 applies electrical signals to the display panel 100. In one embodiment, for instance, the printed circuit board 400 may include a timing controller that receives image data and control signals from an exterior and outputs gate control signals and data control signals.

The printed circuit board 400 is directly below the side portion 310 of the top chassis 300, with respect to a viewing side of the display apparatus. The printed circuit board 400 includes second thru-holes 420 corresponding to the first thru-holes 320, respectively. The first thru-holes 320 and the second thru-holes 420 are aligned with each other, as illustrated in FIG. 2. In exemplary embodiments, for example, the number of the second thru-holes 420 may be the same as the number of the first thru-holes 320. In addition, the printed circuit board 400 may have a bar shape in which a length in a second direction D2 is larger than a length in a first direction D1. In the illustrated exemplary embodiment, since the second thru-holes 420 have the same structure and function, one second thru-hole 420 will be described in detail.

The display apparatus includes coupling members 500 which couple the top chassis 300 with the printed circuit board 400. In the illustrated exemplary embodiment, the number of the coupling members 500 may be the same as the number of the first thru-holes 320. Each of the coupling members 500 is inserted into a corresponding first thru-hole of the first thru-holes 320 and a corresponding second thru-hole of the second thru-holes 420.

The first thru-holes 320 are screw-coupled with the coupling members 500. Each of the first thru-holes 320 includes a first screw mountain and a first screw valley, which are on an inner wall of the side portion 310 defining the first thru-hole 320. The first screw mountain and the first screw valley alternate on the inner wall of the side portion 310 that defines the first thru-hole 320.

The coupling member 500 includes a second screw valley and a second screw mountain, which are coupled with the first screw mountain and the first screw valley, respectively. The coupling member 500 may be a screw (e.g., bolt) including a head portion 510, and a body portion 520 protruded from the head portion 510. The second screw valley and the second screw mountain are on an outer surface of the body portion 520. When viewed in a plan view, the head portion 510 has an area larger than a diameter of the first thru-hole 320.

The side portion 310 of the top chassis 300 includes a first region 310-R1 in which the first thru-hole 320 is provided and a second region 310-R2 adjacent to the first region 310-R1. As shown in FIG. 3, the top chassis 300 has a thickness in the first region 310-R1, which is larger than a thickness of the top chassis 300 in the second region 310-R2. The thicknesses are taken perpendicular to both the first and second directions D1 and D2. Thus, the weight of the top chassis 300 may be reduced since the top chassis 300 has the relatively thin thickness in the second region 310-R2 which does not include the first thru-hole 320. The first thru-hole 320 has a length corresponding to the thickness of the top chassis 300 in the first region 310-R1, so the area including the first screw mountain and the first screw valley may be increased.

The side portion 310 of the top chassis 300 may be provided with the first thru-holes 320. The first thru-holes 320 are successively arranged in a predetermined direction at regular intervals. The printed circuit board 400 includes the second thru-holes 420 respectively corresponding to the first thru-holes 320. In one embodiment, for example, the first thru-holes 320 may be successively arranged in the side portion 310 along the second direction D2, and the second thru-holes 420 may be successively arranged in the second direction D2 in which the printed circuit board 400 is extended.

When the top chassis 300 and the printed circuit board 400 are directly coupled with each other by the coupling member 500, the coupling portion 230 of the bottom chassis 200 may be between the top chassis 300 and the printed circuit board 400. The coupling portion 230 includes a first opening 230-*op* in the first region 310-R1. The first opening 230-*op* may have a diameter larger than the diameter of the first thru-hole 320 in a plan view.

In addition, the display apparatus further includes a mold frame 600 which supports an end of the display panel 100. Similar to the printed circuit board 400, the mold frame 600 may have a bar shape in which a length in the second direction D2 is longer than the length in a first direction D1. A first portion 610 of the mold frame 600 is on a light guide plate 800 and supports the end of the display panel 100.

A second portion 620 of the mold frame 600 may be between the printed circuit board 400 and the side portion 310. The mold frame 600 has a stepped cross-sectional shape in the first direction D1. An upper surface of the first portion 610 is positioned at a level different from a level of the second portion 620. That is, the upper surfaces of the first and second portions 610 and 620 are not coplanar with each other. In addition, the second portion 620 of the mold frame 600 may include a second opening 600-*op* corresponding to the first opening 230-*op*. In alternative embodiments, the mold frame 600 may support at least two ends of the display panel 100 or four ends of the display panel 100. In the case that the mold frame 600 supports the four ends of the display panel 100, the mold frame 600 may have a rectangular ring or frame shape. In addition, the first opening 230-*op* and the second opening 600-*op* accommodate a portion of the top chassis 300 in the first region 310-R1. As illustrated in FIG. 3, the portion of the top chassis 300 in the first region 310-R1 protrudes through the first opening 230-*op* and the second opening 600-*op*, and contacts the printed circuit board 400.

Since the printed circuit board 400 does not overlap the display panel 100 of the display apparatus, an overall thickness of the display apparatus is decreased by the thickness of the printed circuit board 400.

In addition, the display apparatus may further include at least one flexible circuit board FP1 which electrically connects the printed circuit board 400 and the display panel 100. The flexible circuit board FP1 may be connected to the display panel 100 and the printed circuit board 400 through both of opposing ends thereof, which are connected to the display panel 100 and the printed circuit board 400, respectively. A region between the opposing ends of the flexible circuit board FP1 is between the side portion 310 and the printed circuit board 400. In the case that the display apparatus includes the mold frame 600, the region between the both ends of the flexible circuit board FP1 is between the side portion 310 and the mold frame 600. In addition, the flexible printed circuit board FP1 is under the second region 310-R2 of the top chassis 300. Therefore, when the display panel 100, the printed circuit board 400, and the chassis 200 are assembled to each other to complete the display apparatus, the printed circuit board 400 is in close proximity to the display panel 100 without overlapping the display panel 100.

In detail, the flexible circuit board FP1 includes a flexible insulating substrate of polyimide, and circuit patterns on the flexible insulating substrate. The circuit patterns connect circuit patterns, on the printed circuit board 400 to the gate pads or the data pads, which are on the display panel 100. As the flexible circuit board FP1, a tape carrier package on which a driving circuit is mounted may be used.

In addition, the transmissive type display panel like the liquid crystal display panel further includes a light source 700 accommodated in the bottom chassis 200 to generate light. The light source 700 may be a cold cathode fluorescent lamp or a light emitting diode. When the light emitting diode is employed as the light source 700, the light source 700 includes a printed circuit board 740 for the light source 700, and a plurality of light emitting diode packages 720 on the printed circuit board 740 for the light source 700.

Further, the transmissive type display panel further includes the light guide plate 800 that guides the light emitted from the light source 700 to the display panel 100. The light guide plate 800 is under the display panel 100.

The light guide plate 800 may have a size (e.g., planar) corresponding to a size of the display panel 100. The light guide plate 800 includes a plurality of side surfaces. The light source 700 may face at least one side surface of the side surfaces of the light guide plate 800. The side surface of the plurality of side surfaces of the light guide plate 800, which face the light source 700, may serve as an incident surface 810 of the light guide plate 800. In addition, the light guide plate 800 includes an exit surface 812 and a reflection surface 814. The exit surface 812 is extended from a first end of the incident surface 810 and the light incident to the light guide plate 800 exits through the exit surface 812. The reflection surface 814 is extended from a second end of the incident surface 810 and faces the exit surface 812, and reflects the light incident through the incident surface 810 to the exit surface 812.

The display apparatus further includes a reflection sheet 820 between the light guide plate 800 and the bottom portion 210 to reflect the light leaked from the light guide plate 800. That is, the reflection sheet 820 re-reflects the light leaked from the light guide plate 800 back toward the light guide plate 800.

The display apparatus further includes an optical sheet between the light guide plate 800 and the display panel 100, which diffuses or condenses the light exiting from the light guide plate 800. The optical sheet may be a diffusion sheet 840. The diffusion sheet 840 diffuses the light exiting from the light guide plate 800 to improve the brightness of the light provided to the display panel 100.

Figure 5A:
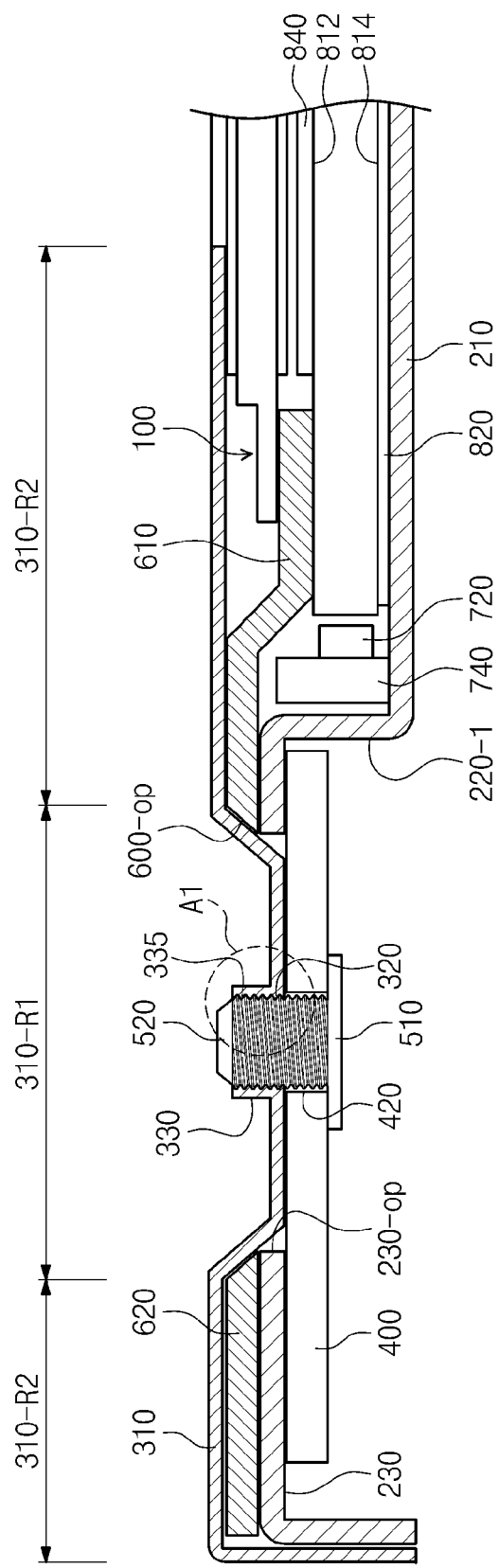
FIG. 5A is a cross-sectional view showing another exemplary embodiment of a display apparatus according to the invention.
Figure 5B:
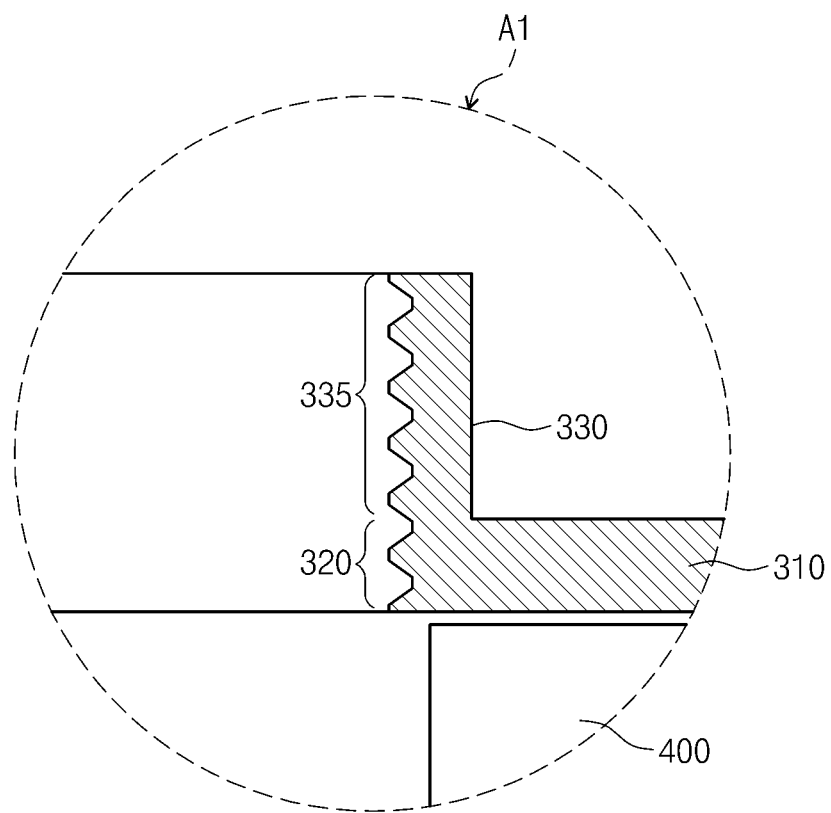
FIG. 5B is a partially enlarged view showing a portion A1 shown in FIG. 5A.

FIG. 5A is a cross-sectional view showing another exemplary embodiment of a display apparatus according to the invention, FIG. 5B is a partially enlarged view showing portion A1 shown in FIG. 5A, and FIG. 6 is a cross-sectional view showing still another exemplary embodiment of a display apparatus according to the invention. In FIGS. 5A, 5B, and 6, the same reference numerals denote the same elements in FIGS. 1 to 4, and thus detailed descriptions of the same elements will be omitted.

Referring to FIGS. 5A and 5B, the display apparatus includes the display panel 100 displaying an image, the bottom chassis 200, the top chassis 300 facing the bottom chassis 200 while interposing the display panel 100 therebetween, and the printed circuit board 400 applying electrical signals to the display panel 100.

The top chassis 300 further includes a protrusion portion 330 protruded from a surface of the side portion 310. The protrusion portion 330 is in the first region 310-R1. The protrusion portion 330 may be protruded from the upper surface of the side portion 310 provided in the first region 310-R1 as shown in FIGS. 5A and 5B. The protrusion portion 330 includes a third thru-hole 335 extended from and aligned with the first thru-hole 320. Thus, the coupling member 500 is inserted into the first thru-hole 320 and the third thru-hole 335. In the illustrated exemplary embodiment, the third thru-hole 335 has the same diameter as the diameter of the first thru-hole 320.

The third thru-hole 335 may include the first screw mountain and the first screw valley on the inner wall of the protrusion portion 330 which defines the first thru-hole 320. The coupling member 500 including the second screw valley and the screw mountain is coupled with the third thru-hole 335 after passing through the first thru-hole 320, so that the coupling force between the top chassis 300 and the printed circuit board 400 may be enhanced.

As shown in FIG. 5A, the upper surface of the side portion 310 in the first region 310-R1 is positioned at a level lower than a level of the upper surface of the side portion 310 in the second region 310-R2, and thus a lower surface of the side portion 310 in the first region 310-R1 is positioned at a level lower than a level of the lower surface of the side portion 310 in the second region 310-R2. Accordingly, an upper end of the protrusion portion 330 in the first region 310-R1 is positioned at a level lower than the level of the upper surface of the side portion 310.

In addition, a portion of the lower surface of the side portion 310 in the first region 310-R1 and a portion of the upper surface of the side portion 310 in the first region 310-R1 may be substantially parallel to the lower surface of the side portion 310 in the second area 310-R2. As shown in FIGS. 5A and 5B, in the case that the coupling portion 230 and the second portion 620 of the mold frame 600 are between the printed circuit board 400 and the side portion 310, the first opening 230-*op* and the second opening 600-*op* accommodate the lower surface of the side portion 310 in the first region 310-R1. In this case, the lower surface of the side portion 310 in the first region 310-R1, which is parallel to the lower surface of the side portion 310 in the second region 310-R2, may make contact with the upper surface of the printed circuit board 400.

As shown in FIG. 6, according to still another exemplary embodiment of a display apparatus according to the invention, the protrusion portion 330 is protruded downward from the lower surface of the side portion 310 in the first region 310-R1, and the protrusion portion 330 is inserted into the second thru-hole 420 of the printed circuit board 400.

When viewed in a plan view, the second thru-hole 420 has an inner diameter larger than an outer diameter of the protrusion portion 330. In addition, the protrusion portion 330 has a height smaller than the length of the inner wall of the second thru-hole 420 to reduce or effectively prevent further protrusion the protrusion portion 330 inserted into the second thru-hole 420 extending further than the lower surface of the printed circuit board 400.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
    a display panel which receives a light and displays an image using the light;
    a bottom chassis which accommodates the display panel;
    a top chassis which faces the bottom chassis with the display panel therebetween, overlaps at least a portion of the display panel, and at least one first thru-hole which is defined in the top chassis and extends through a thickness of a side portion thereof;
    a printed circuit board which applies an electrical signal to the display panel and overlaps the side portion, and a second thru-hole which is defined in the printed circuit board and corresponds to the first thru-hole; and
    a coupling member which extends through the first thru-hole and the second thru-hole, and couples the top chassis and the printed circuit board to each other,
    wherein a portion of the bottom chassis is between the top chassis and the printed circuit board, in a cross-section thickness direction.

2. The display apparatus of claim 1, wherein the first thru-hole comprises a first screw mountain and a first screw valley on an inner wall of the first thru-hole.

3. The display apparatus of claim 2, wherein the coupling member comprises a second screw valley and a second screw mountain, which are coupled with the first screw mountain and the first screw valley, respectively.

4. The display apparatus of claim 3, wherein the side portion of the top chassis comprises a first region in which the first thru-hole is defined, and a second region adjacent to the first region.

5. The display apparatus of claim 4, wherein the first region of the side portion of the top chassis has a cross-sectional thickness larger than that of the second region.

6. The display apparatus of claim 4, wherein the bottom chassis comprises:
   a bottom portion,
   a sidewall portion which extends towards the top chassis from the bottom portion, and
   a coupling portion which extends from the sidewall portion and is between the side portion of the top chassis and the printed circuit board,
   wherein the bottom portion, the sidewall portion and the coupling portion collectively form a single, unitary, indivisible member.

7. The display apparatus of claim 6, wherein the coupling portion of the bottom chassis comprises a first opening which corresponds to the first region of the side portion of the top chassis.

8. The display apparatus of claim 7, further comprising a mold frame including:
   a first portion which supports an end of the display panel, and
   a second portion between the printed circuit board and the side portion of the top chassis.

9. The display apparatus of claim 8, further comprising a flexible circuit board partially between the top chassis and the mold frame, wherein the flexible circuit board electrically connects the printed circuit board and the display panel to each other.

10. The display apparatus of claim 4, wherein the top chassis further includes a protrusion portion which protrudes from edges of the first thru-hole in the first region, and includes a third thru-hole which is aligned with the first thru-hole.

11. The display apparatus of claim 10, wherein the first screw mountain and the first screw valley extend to an inner wall of the third thru-hole.

12. The display apparatus of claim 11, wherein
an upper surface of the side portion of the top chassis in the first region is at a level lower than a level of an upper surface of the side portion of the top chassis in the second region, and
a lower surface of the side portion of the top chassis in the first region is at a level lower than a level of a lower surface of the side portion of the top chassis in the second region.

13. The display apparatus of claim 12, wherein the protrusion portion protrudes towards the printed circuit board from the lower surface of the side portion, in the first region.

14. The display apparatus of claim 13, wherein the protrusion portion extends into the second thru-hole.

15. The display apparatus of claim 1, further comprising a plurality of first thru-holes which are successively arranged in a longitudinal direction of the printed circuit board and at regular intervals.

16. The display apparatus of claim 1, further comprising:
   a light source in the bottom chassis, wherein the light source generates and emits the light; and
   a light guide plate under the display panel, wherein the light guide plate guides the light emitted from the light source to the display panel.

17. The display apparatus of claim 16, wherein
the light guide plate comprises a plurality of side surfaces, and
the light source faces at least one side surface of the side surfaces of the light guide plate.

18. The display apparatus of claim 17, further comprising:
   a reflection sheet between the light guide plate and a bottom portion of the bottom chassis, wherein the reflection sheet reflects the light leaked from the light guide plate; and
   an optical sheet between the light guide plate and the display panel, wherein the optical sheet diffuses or condenses the light exiting from the light guide plate.

19. A display apparatus comprising:
   a display panel which receives a light and displays an image;
   a printed circuit board parallel to the display panel, wherein the printed circuit board applies an electrical signal to the display panel, and a first thru-hole defined in the printed circuit board;
   a top chassis including a first cover region which overlaps a portion of the display panel, and a second cover region which overlaps the printed circuit board, and a second thru-hole defined in the second cover region and corresponds to the first thru-hole;
   a bottom chassis which accommodates the display panel and faces the top chassis, wherein
   the display panel is between the bottom chassis and the top chassis, and
   a portion of the bottom chassis is between the printed circuit board and the top chassis, in a cross-section thickness direction; and
   a coupling member which extends through the first thru-hole and the second thru-hole, and couples the top chassis and the printed circuit board.

* * * * *